United States Patent
Barcia et al.

(10) Patent No.: US 8,874,798 B2
(45) Date of Patent: Oct. 28, 2014

(54) ASPECT ORIENTED APPLICATION OF A MEDIATOR IN AN ENTERPRISE SERVICE BUS (ESB) OF A SERVICE ORIENTED ARCHITECTED DATA PROCESSING SYSTEM

(75) Inventors: Roland Barcia, Leonia, NJ (US); Kyle G. Brown, Apex, NC (US); Robert R. Peterson, Austin, TX (US); Rachel M. Reinitz, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 1924 days.

(21) Appl. No.: 11/776,216

(22) Filed: Jul. 11, 2007

(65) Prior Publication Data

US 2009/0019421 A1 Jan. 15, 2009

(51) Int. Cl.
*G06F 15/16* (2006.01)
*G06F 9/44* (2006.01)

(52) U.S. Cl.
CPC ............................. *G06F 8/316* (2013.01)
USPC ......................................... 709/253; 709/240

(58) Field of Classification Search
USPC ........................................................ 709/253
See application file for complete search history.

(56) References Cited

U.S. PATENT DOCUMENTS

| | | | |
|---|---|---|---|
| 7,571,196 B2* | 8/2009 | Purdy et al. | 707/203 |
| 2006/0010195 A1* | 1/2006 | Mamou et al. | 709/203 |
| 2007/0143302 A1* | 6/2007 | Stone | 707/10 |
| 2007/0250482 A1* | 10/2007 | Yao et al. | 707/3 |
| 2008/0040151 A1* | 2/2008 | Moore | 705/2 |
| 2009/0019421 A1* | 1/2009 | Barcia et al. | 717/102 |
| 2009/0055437 A1* | 2/2009 | Ceusters et al. | 707/104.1 |
| 2009/0172773 A1* | 7/2009 | Moore | 726/1 |

* cited by examiner

*Primary Examiner* — Ebrahim Golabbakhsh
(74) *Attorney, Agent, or Firm* — Steven M. Greenberg, Esq.; CRGO Law

(57) ABSTRACT

Embodiments of the present invention address deficiencies of the art in respect to mediation application in an ESB and provide a novel and non-obvious method, system and computer program product for aspect oriented application of a mediation in an ESB. In one embodiment, a method for aspect oriented application of a mediation in an ESB can be provided. The method can include installing an aspect in an ESB, the aspect referencing at least one mediation and associating the at least one mediation with at least one target in the ESB. The method further can include applying the at least one mediation in the aspect to each associated target in the ESB.

14 Claims, 3 Drawing Sheets

ASPECT ORIENTED APPLICATION OF A MEDIATOR IN AN ENTERPRISE SERVICE BUS (ESB) OF A SERVICE ORIENTED ARCHITECTED DATA PROCESSING SYSTEM

BACKGROUND OF THE INVENTION

1. Field of the Invention

The present invention relates to the field of commerce systems and more particularly to the field of service oriented architected applications.

2. Description of the Related Art

It is now a common trend that traditional, stand-alone, commerce oriented applications are produced from one or more components which can be individually re-used to create business processes for different solutions. Each of these components can expose itself as a set of reusable business functions, also referred to as "services" comporting with computing standards for deploying enterprise level logic that facilitate an open service oriented architecture (SOA). An SOA essentially can be defined as a system where all exposed business and technical functions are in the form of reusable services. These reusable services can communicate with each other to engage either in simple data passing between two or more services, or in activity coordination by two or more services.

In a SOA, a client can invoke an operation on a service to perform a function and, optionally the client can receive a response. Invoked services are generally business functions configured to fulfill the needs of business customers, whether those customers are individual consumers or other businesses. The functions can be grouped into various services where each service can specialize in functions such as catalog management, shopping cart management, credit card transaction processing, sales tax computation and the like. By utilizing an SOA, services in a commerce solution can interoperate with other business processes in a larger commerce solution involving one or more separate business entities and one or more separate consumer entities.

An enterprise service bus (ESB) serves the purpose of simplifying the integration and flexible reuse of business components using an SOA. Generally, an ESB supports the goals of service orientation by enabling the dynamic connection, mediation and control of services and their interactions. In this regard, mediation is an essential capability of an ESB and provides several principal benefits. In particular, mediation allows the ESB to reconcile incompatible protocols, data formats and interaction patterns of connected services. By bridging these differences with the built-in mediation functionality of the ESB, it is much easier to rapidly set up communications among diverse services.

The ESB likewise mediates not just message format and protocol but also interaction patterns, allowing synchronous and asynchronous services to communicate with no changes to the coding of the services. The ability to mediate services without requiring changes to the services eliminates inflexible, hard-coded service interdependencies. In particular, service interdependencies defeat flexibility in that service interdependencies inhibit an understanding of the impact of a service change in an SOA. Thus, by isolating and making explicit the mediation among services, an ESB dramatically facilitates the management of change in a complex environment. The flexibility of mediation can be seen more broadly in that the ESB allow the combination and extension of existing services to meet new requirements. As such, mediated services become general-purpose building blocks which may be orchestrated in order to automate end-to-end business processes.

Mediated services, often referred to as "mediations" can perform repetitive functions including encryption, logging and validation. Oftentimes, the logic for repetitive functions is "cross-cutting" in that the logic of the mediation spans individual components as the function can be applied across multiple different modules. Aspect Oriented Programming (AOP) addresses the problem of cross-cutting logic by allowing the expression of cross-cutting concerns in stand-alone modules termed "aspects".

However, unlike ordinary cross-cutting logic, a mediation in an ESB must be installed everywhere that the logic of the mediation is to be used. In as much as the mediation can reside in a separate process from the producer and consumer, and further because the mediation can be implemented in a different environment and in a different programming language, AOP cannot be used. Accordingly, the mediation must be installed on each communicative link between consumer or provider and the ESB.

BRIEF SUMMARY OF THE INVENTION

Embodiments of the present invention address deficiencies of the art in respect to mediation application in an ESB and provide a novel and non-obvious method, system and computer program product for aspect oriented application of a mediation in an ESB. In one embodiment, a method for aspect oriented application of a mediation in an ESB can be provided. The method can include installing an aspect in an ESB, the aspect referencing at least one mediation and associating the at least one mediation with at least one target in the ESB. The method further can include applying the at least one mediation in the aspect to each associated target in the ESB.

In another embodiment of the invention, an SOA data processing system can be provided. The system can include an enterprise service bus ESB coupled to producer server computing platforms publishing services in an SOA. The system further can include mediations defined for the SOA, and an application server supporting aspect oriented mediation application logic. The logic can include program code enabled to process a mediation aspect referencing at least one of the mediations and associating the at least one of the mediations with at least one targeted one of the services in the ESB, and to apply the at least one of the mediations in the aspect to each targeted one of the services in the ESB.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for aspect oriented application of a mediation in an ESB. In accordance with an embodiment of the present invention, an aspect can be established to include a listing of one or more mediations and one or more targets for association with the mediations. The targets can include, for example, destinations in a message based ESB, or different component interfaces in a service based ESB. Once established, the aspect can be deployed to the ESB and the ESB can establish communicative linkages between each specified mediation in the aspect and corresponding specified targets on the ESB. In this way, mediations can be deployed in an ESB without requiring a manual coupling of each mediation to each target.

Figure 1:
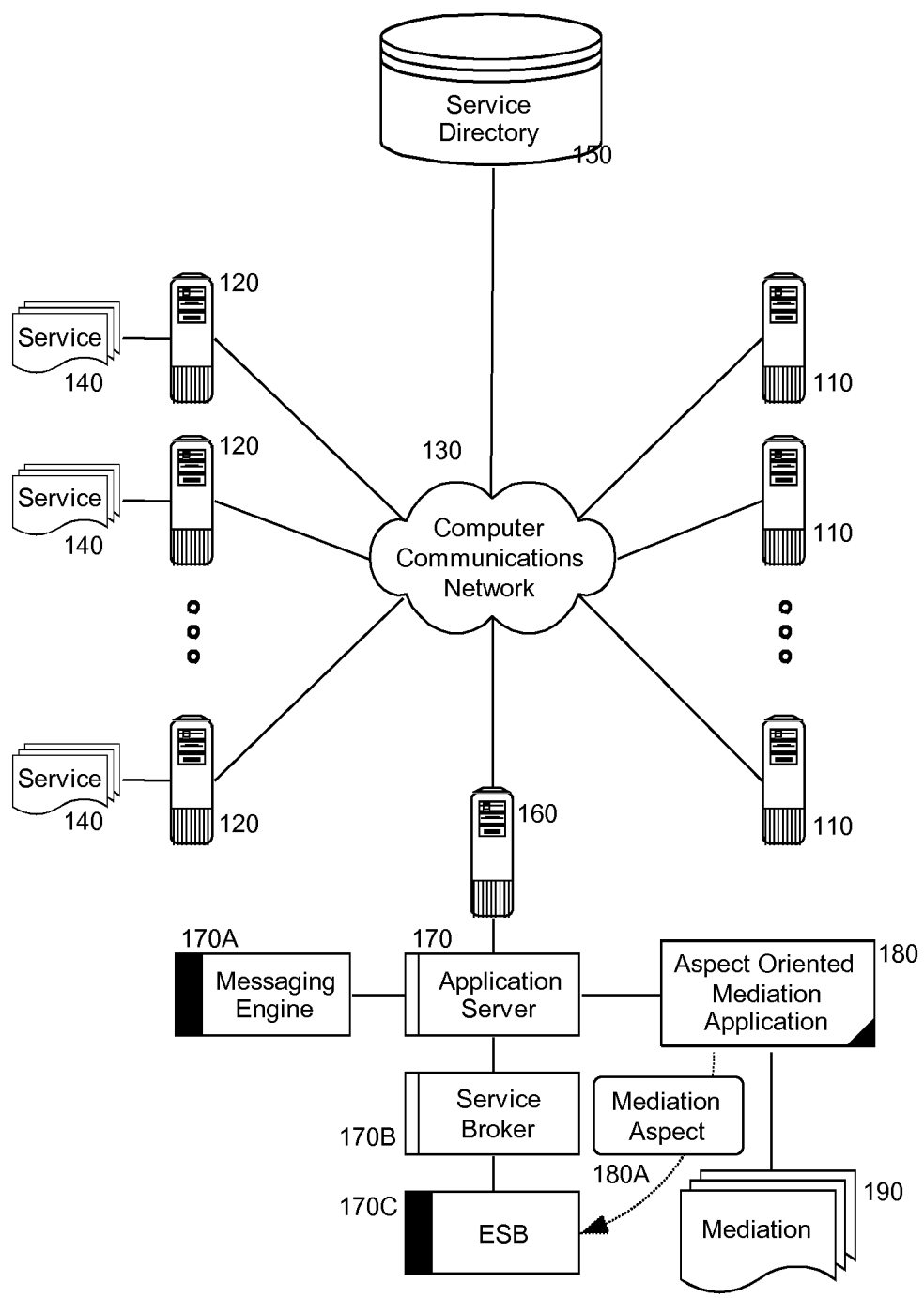
FIG. 1 is a schematic illustration of an service oriented architected data processing system configure for aspect oriented application of a mediation in an ESB.

In illustration, FIG. 1 is a schematic illustration of a service oriented architected data processing system configure for aspect oriented application of a mediation in an ESB. The system can include one or more producer server computing platforms 120 coupled to one or more consumer server computing platforms 110 over a computer communications network 130. The producer server computing platforms 120 can provide access to the consumer server computing platforms 110 to one or more services 140 embodied in the form of computing components published by the producer server computing platforms 120, for example in support of an SOA environment. In this regard, a services directory 150 can be disposed about the computer communications network 130 providing references to corresponding requested ones of the services 140.

A host computing platform 160 further can be coupled to the computer communications network 130. The host computing platform 160 can support the operation of an application server 170. The application server 170, in turn, can provide an ESB for use in the SOA environment established between the producer server computing platforms 120 and the consumer server computing platforms 1 10. To that end, a messaging engine 170A can operate in the application server 170 to support a message based ESB. Alternatively, a service broker 170B can operate in the application server 170 to support a service based ESB. It will be recognized by the skilled artisan, however, that other forms of communicative linkage between components on the ESB 170C can be provided in addition to message based and service based.

Notably, aspect oriented mediation application logic 180 can be coupled to the application server 170. The aspect oriented mediation application logic 180 can include program code enabled to install a mediation aspect 180A into the ESB 170C referencing one or more mediations 190. The mediation aspect 180A further can reference one or more targets for each of the referenced mediations 190. In particular, the each of the targets can include a destination in a message based form of the ESB 170C, or a component interface in a service based form of the ESB 170C. Finally, the program code of the aspect oriented mediation application logic 180 can be enabled to process the mediation aspect 180A to apply each referenced one of the mediations 190 in the mediation aspect 180A to corresponding referenced targets on the ESB 170C. In this way, a mediation need not be installed at each end point.

Figure 2A:
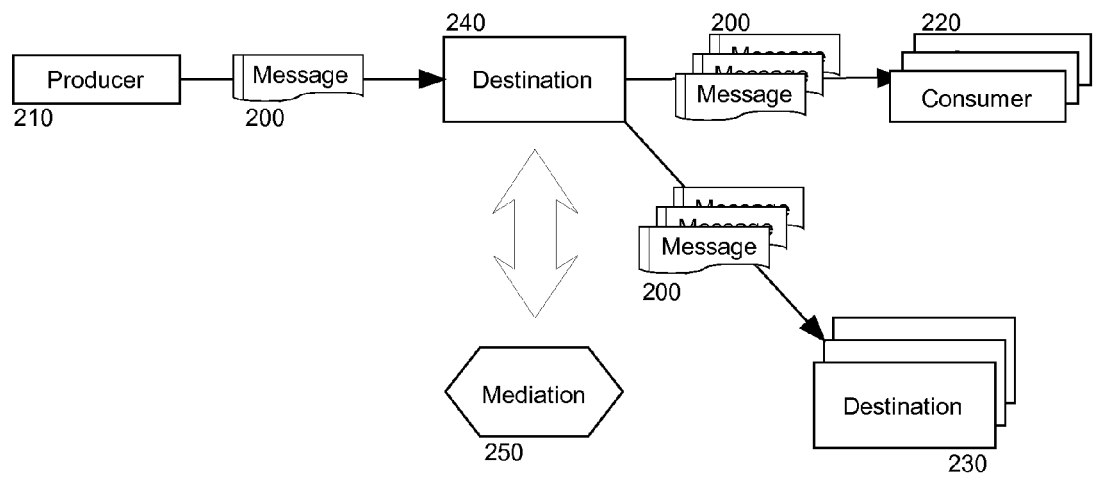
FIG. 2A is an block diagram illustrating a process for aspect oriented application of a mediation in a messaging based ESB.

In further illustration, FIG. 2A is a block diagram illustrating a process for aspect oriented application of a mediation in a messaging based ESB. As shown in FIG. 2A, a service producer 210 can target one or more consumers 220 and other destinations 230 on an ESB via a message queue 240 configured as an intermediate destination on the ESB. A mediation 250, in turn, can be coupled to the message queue 240. The mediation 250 can receive and process different messages 200 routed to the different service consumers 220 and other destinations 230, only for those different service consumers 220 and other destinations 230 associated with the mediation 250 in an installed mediation aspect for the message based ESB. In this regard, for a message based ESB, an exemplary mediation aspect can include:

```
mediationAspect MyMediationAspect
{
    Mediations
    {
        Name:Mediation1
        Name:Mediation2
    }
    PointCut: destination=jms/*ServiceQueue && bus=*MyBus
}
```

Figure 3A:
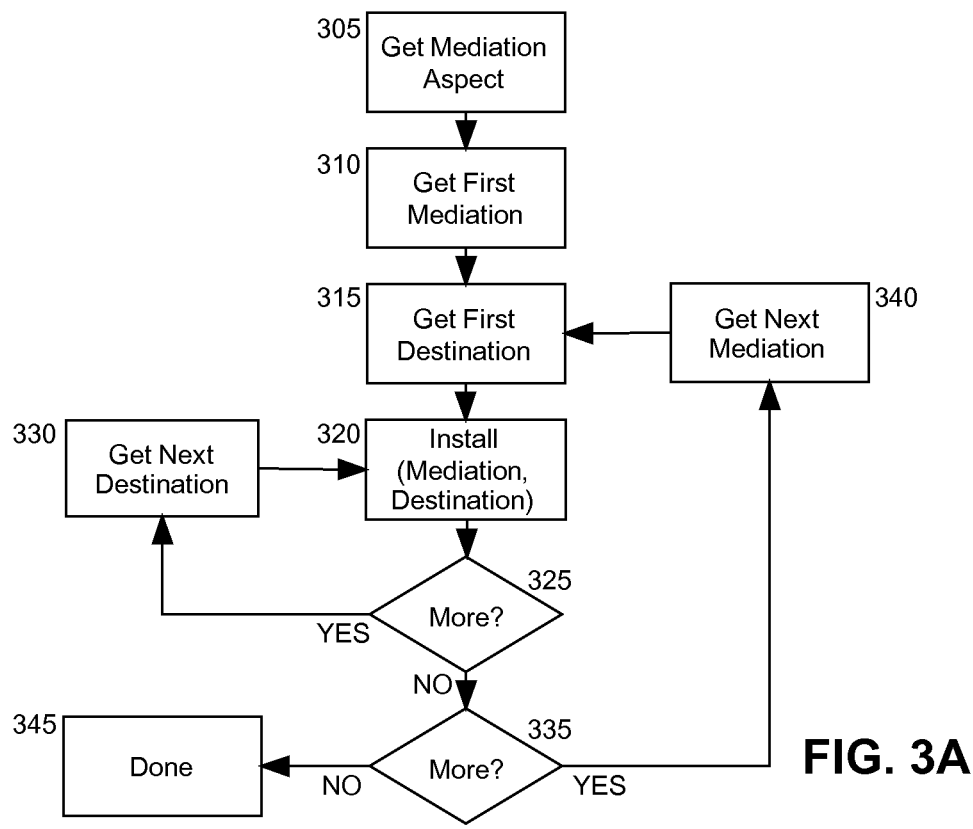
FIG. 3A is a flow chart illustrating a process for aspect oriented application of a mediation in a messaging based ESB; and, FIG. 3B is a flow chart illustrating a process for aspect oriented application of a mediation in a service based ESB.

In yet further illustration, FIG. 3A is a flow chart illustrating a process for aspect oriented application of a mediation in a messaging based ESB. Beginning in block 305, a mediation aspect can be retrieved once the aspect has been installed in the message based ESB. in block 310, the aspect can be processed to select a first mediation referenced within the aspect. In block 310, a first destination associated with the mediation can be identified and in block 320, the mediation can be installed for the identified destination. In this regard, the message queue can filter for messages intended for the identified destination and can pass the messages, in addition to the identified destination, to the mediation.

In decision block 325, if additional destinations have been associated with the mediation, in block 330 the next destination associated with the mediation can be identified and in block 320, the mediation can be installed for the identified destination. When no further destinations have been associated with the mediation, in decision block 335 it can be determined whether the aspect references additional mediations. If so, in block 340 a next mediation can be selected for processing. Thereafter, the process can repeat through block 315 until no further mediations remain. Subsequently, in block 345 the process can end.

Figure 2B:
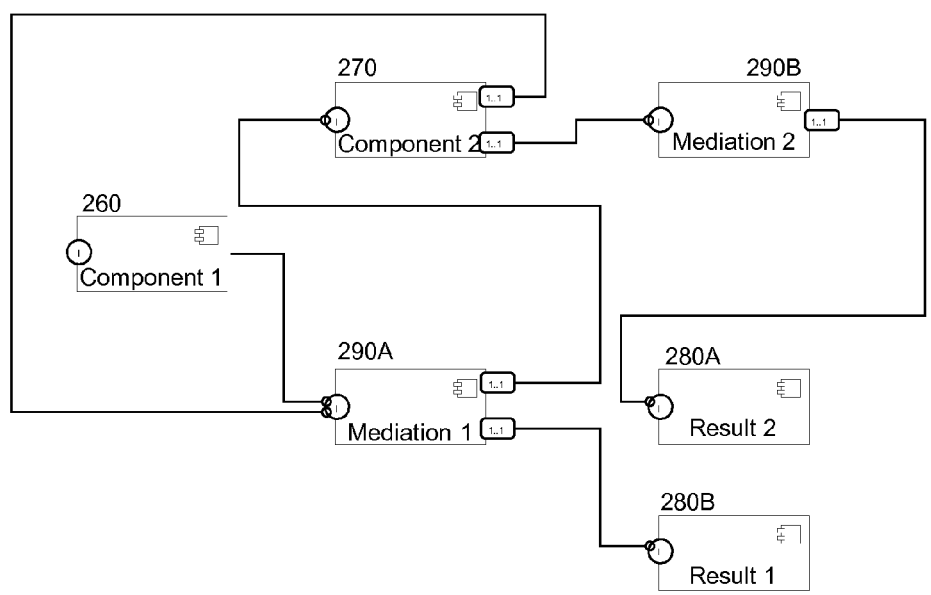
FIG. 2B is a block diagram illustrating a process for aspect oriented application of a mediation in a service based ESB.

By comparison to the message based ESB of FIG. 2A, FIG. 2B is a block diagram illustrating a process for aspect oriented application of a mediation in a service based ESB. The service based ESB can include one or more service components 260, 270, each having an interface through which the service components 260, 270 can exchange messages. Through the processing of a mediation aspect associating different mediations 290A, 290B with the interfaces of different ones of the service components 260, 270, the mediations 290A, 290B can be intermediately disposed in the path of service components 260, 270 and results 280A, 280B matching a filter included in the mediation aspect. In this regard, for a service based ESB, an exemplary mediation aspect can include:

```
mediationAspect MyMediationAspect
{
    Mediations
    {
        Name:Mediation1
        Name:Mediation2
    }
    PointCut: service=My*Service.wsdl && operation=getData
}
```

Notably, the PointCut reference in the aspect can incorporate a wildcard such that multiple services can match the filter in the aspect and multiple operations can match the filter in the aspect.

Figure 3B:
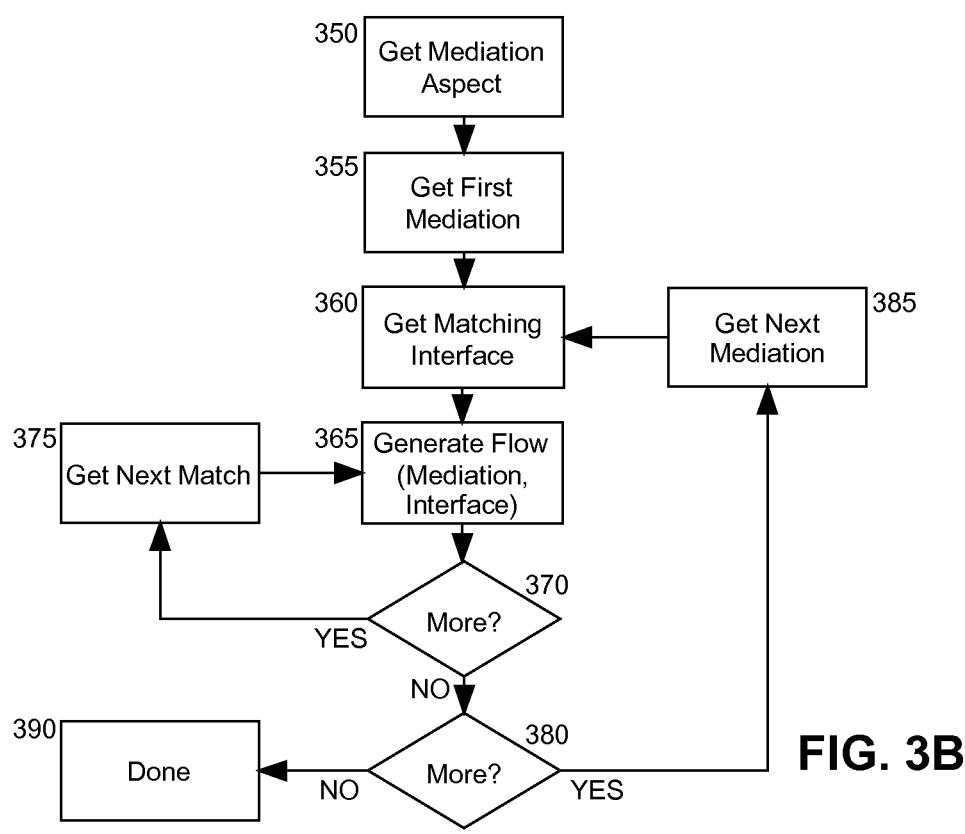

In further illustration, FIG. 3B is a flow chart illustrating a process for aspect oriented application of a mediation in a service based ESB. Beginning in block 350, a mediation aspect can be retrieved once the aspect has been installed in the service based ESB. In block 355, the aspect can be processed to select a first mediation referenced within the aspect. In block 360, a first interface matching the filter in the aspect for the mediation can be identified and in block 365, a service component architecture flow can be established to couple the mediation to the interface.

Thereafter, in decision block 370, if additional matching interfaces can be identified for the mediation, in block 375 the next matching interface can be identified and the process can repeat through block 365. When no further destinations have been associated with the mediation, in decision block 380 it can be determined whether the aspect references additional mediations. If so, in block 385 a next mediation can be selected for processing. Thereafter, the process can repeat through block 360 until no further mediations remain. Subsequently, in block 390 the process can end.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for aspect oriented application of a mediation in an enterprise service bus (ESB), the method comprising:
    installing an aspect in an ESB provided by an application server executing in memory by at least one processor of a host computing platform, the aspect referencing at least one mediation and associating the at least one mediation with at least one target in the ESB; and
    applying the at least one mediation in the aspect to each associated target in the ESB so that the at least one mediation is associated with each associated target only once.

2. The method of claim 1, wherein installing an aspect in an ESB, the aspect referencing at least one mediation and associating the at least one mediation with at least one target in the ESB, comprises installing an aspect in a message based ESB, the aspect referencing at least one mediation and associating the at least one mediation with at least one destination in the message based ESB.

3. The method of claim 1, wherein installing an aspect in an ESB, the aspect referencing at least one mediation and associating the at least one mediation with at least one target in the ESB, comprises installing an aspect in a service based ESB, the aspect referencing at least one mediation and associating the at least one mediation with at least one service interface for a corresponding component in the service based ESB.

4. The method of claim 2, wherein applying the at least one mediation in the aspect to each associated target in the ESB, comprises applying the at least one mediation in the aspect to each associated destination in the message based ESB.

5. The method of claim 3, wherein applying the at least one mediation in the aspect to each associated target in the ESB, comprises applying the at least one mediation in the aspect to each associated service interface for a corresponding component in the service based ESB.

6. A service oriented architecture (SOA) data processing system comprising:
    a host computing platform comprising memory and at least one processor;
    an enterprise service bus (ESB) coupled to a plurality of producer server computing platforms publishing services in an SOA;
    a plurality of mediations defined for the SOA; and
    an application server executing in the memory by at least one processor of the host computing platform, the application server supporting aspect oriented mediation application logic comprising program code enabled to process a mediation aspect referencing at least one of the mediations and associating the at least one of the mediations with at least one targeted one of the services in the ESB, and to apply the at least one of the mediations in the aspect to each targeted one of the services in the ESB so that the at least one mediation is associated with each associated target only once.

7. The system of claim 6, wherein the ESB is a message based ESB, the system further comprising a message queue coupled to the application server.

8. The system of claim 6, wherein the ESB is a service based ESB, the system further comprising a service broker coupled to the application server.

9. The system of claim 6, wherein the mediation aspect comprises an association between at least one of the mediations and a plurality of the services according to a wildcard value in the association.

10. A computer program product comprising a computer usable storage medium embodying computer usable program code for aspect oriented application of a mediation in an enterprise service bus (ESB), the computer program product including:

computer usable program code for installing an aspect in an ESB, the aspect referencing at least one mediation and associating the at least one mediation with at least one target in the ESB; and computer usable program code for applying the at least one mediation in the aspect to each associated target in the ESB so that the at least one mediation is associated with each associated target only once.

11. The computer program product of claim 10, wherein the computer usable program code for installing an aspect in an ESB, the aspect referencing at least one mediation and associating the at least one mediation with at least one target in the ESB, comprises computer usable program code for installing an aspect in a message based ESB, the aspect referencing at least one mediation and associating the at least one mediation with at least one destination in the message based ESB.

12. The computer program product of claim 10, wherein the computer usable program code for installing an aspect in an ESB, the aspect referencing at least one mediation and associating the at least one mediation with at least one target in the ESB, comprises computer usable program code for installing an aspect in a service based ESB, the aspect referencing at least one mediation and associating the at least one mediation with at least one service interface for a corresponding component in the service based ESB.

13. The computer program product of claim 11, wherein the computer usable program code for applying the at least one mediation in the aspect to each associated target in the ESB, comprises computer usable program code for applying the at least one mediation in the aspect to each associated destination in the message based ESB.

14. The computer program product of claim 12, wherein the computer usable program code for applying the at least one mediation in the aspect to each associated target in the ESB, comprises computer usable program code for applying the at least one mediation in the aspect to each associated service interface for a corresponding component in the service based ESB.

* * * * *